(12) United States Patent
Seshita et al.

(10) Patent No.: US 10,742,087 B2
(45) Date of Patent: Aug. 11, 2020

(54) MOTOR APPARATUS WITH WATERPROOF COVER FOR VEHICLE

(71) Applicant: IGARASHI ELECTRIC WORKS LTD., Kawasaki-shi, Kanagawa (JP)

(72) Inventors: Naoto Seshita, Kawasaki (JP); Ryo Nazawa, Kawasaki (JP); Yusuke Mizukoshi, Kawasaki (JP)

(73) Assignee: IGARASHI ELECTRIC WORKS LTD., Kawasaki-Shi (JP)

( * ) Notice: Subject to any disclaimer, the term of this patent is extended or adjusted under 35 U.S.C. 154(b) by 186 days.

(21) Appl. No.: 16/063,869

(22) PCT Filed: Sep. 7, 2017

(86) PCT No.: PCT/JP2017/032384
§ 371 (c)(1),
(2) Date: Jun. 19, 2018

(87) PCT Pub. No.: WO2019/049297
PCT Pub. Date: Mar. 14, 2019

(65) Prior Publication Data
US 2019/0157936 A1 May 23, 2019

(51) Int. Cl.
*H02K 5/10* (2006.01)
*B60J 11/08* (2006.01)
(Continued)

(52) U.S. Cl.
CPC .............. *H02K 5/10* (2013.01); *B60J 11/04* (2013.01); *B60J 11/08* (2013.01); *H02K 7/116* (2013.01); *H02K 5/22* (2013.01)

(58) Field of Classification Search
CPC .. H02K 5/10; H02K 5/22; H02K 7/116; B60J 11/04; B60J 11/08
See application file for complete search history.

(56) References Cited

U.S. PATENT DOCUMENTS 4,544,198 A * 10/1985 Ochiai ................... B60J 5/0479
296/155
6,139,088 A * 10/2000 Okamoto ............... B60J 5/0416
296/146.1
(Continued)

FOREIGN PATENT DOCUMENTS

JP          H06-29363 U      4/1994
JP       2002-354745 A1     12/2002
(Continued)

OTHER PUBLICATIONS

International Search Report Corresponding to PCT/JP2017/032384 dated Nov. 28, 2017.

*Primary Examiner* — Emily P Pham
(74) *Attorney, Agent, or Firm* — Davis & Bujold PLLC; Michael J. Bujold

(57) ABSTRACT

A resin waterproof cover for covering an outside of a motor apparatus is comprising a cylindrical cap, a cap cover, a lead wire guide portion for inverting and leading out a power supply lead wire from inside of a motor case to the outside of the waterproof cover into a U shape, and cap engagement portions. The resin waterproof cover further comprises a first seal portion made of a photo-curable adhesive formed between the outer periphery near the bottom of the motor case, the other end of the cylindrical cap, and an end bracket of a reduction gear structure, a second seal portion made of a photo-curing adhesive formed on the lead wire guide portion, and a third seal portion made of a light curable adhesive formed between the periphery of one end of the cylindrical cap and the cap cover.

8 Claims, 10 Drawing Sheets

(51) Int. Cl.
  *B60J 11/04*   (2006.01)
  *H02K 7/116*   (2006.01)
  *H02K 5/22*    (2006.01)

(56) References Cited

U.S. PATENT DOCUMENTS

| | | | |
|---|---|---|---|
| 6,886,874 B2 * | 5/2005 | Abe | B60R 13/00 |
| | | | 296/1.08 |
| 7,554,235 B2 * | 6/2009 | Kano | H02K 5/225 |
| | | | 310/71 |
| 9,097,256 B2 | 8/2015 | Yokozawa et al. | |
| 9,605,452 B2 | 3/2017 | Yoshino et al. | |
| 9,702,179 B2 | 7/2017 | Shimizu et al. | |
| 2010/0194122 A1 * | 8/2010 | Akizuki | E05B 81/20 |
| | | | 292/216 |

FOREIGN PATENT DOCUMENTS

| | | |
|---|---|---|
| JP | 2005-315022 A | 11/2005 |
| JP | 2009-278844 A | 11/2009 |
| JP | 2012-046989 A | 3/2012 |
| JP | 2013-047509 A | 3/2013 |
| JP | 2014-095251 A | 5/2014 |
| JP | 2015-031083 A | 2/2015 |
| JP | 2016-098629 A | 5/2016 |

\* cited by examiner

MOTOR APPARATUS WITH WATERPROOF COVER FOR VEHICLE

TECHNICAL FIELD OF THE INVENTION

The present invention relates to a motor apparatus with waterproof cover for a vehicle, and more particularly, relates to a motor apparatus with reduction gear structure and suitable for being mounted in a door body of a vehicle.

BACKGROUND OF THE INVENTION

For a lock mechanism or for a pop-up mechanism of a door handle apparatus of a vehicle, a DC motor apparatus with reduction gear structure is used as a driving source of them.

For example, a two pole permanent magnet DC motor apparatus with brush system is widely used as a driving source for various actuators of vehicles, because a DC motor has many advantages such as the same torque characteristics regardless of rotation in either forward and reverse directions, withstanding long-term use, small size to use, and low price.

Such a DC motor is also suitable as a drive source of a pop-up mechanism required forward and reverse rotation. Namely, for the motor apparatus with reduction gear, the operation time required to change the position of the door handle is short. Therefore, even a compact DC motor has sufficient characteristics to withstand long-term use as a drive source of the pop-up mechanism.

On the other hand, in Japanese Unexamined Patent pre-grant publication No. 2016-98629, an example in which a waterproof mechanism is provided in a closer device for a locking mechanism for door of a vehicle is disclosed. In this example, a motor apparatus with reduction gear structure is housed in a case made of a body and a housing, and a waterproof cap is provided in the opening portion at the tip of the case.

In Japanese Unexamined Patent pre-grant publication No. 2012-46989, another example in which a waterproof mechanism is provided in a drive unit of a power slide apparatus in a vehicle is disclosed. In this example, for constituting a drive unit, a motor apparatus with reduction gear structure is accommodated in a case formed of a waterproof cover and a bracket.

Further, in Japanese Unexamined Patent pre-grant publications No. 2015-31083 and No. 2014-95251, examples using a motor apparatus with reduction gear structure as a drive source of a pop-up mechanism for a door handle of a vehicle is disclosed, respectively. In the pop-up mechanism, an outside door handle provided on the door is displaced by the motor apparatus with reduction gear structure installed in the door, via a transmission mechanism including a cam, a lever, and the like.

That is, usually, the pop-up mechanism places the outside door handle inside the door of the vehicle to reduce the running resistance, and only when the user opens the door, projects the outside door handle outward of the door so that the user can grasp the outside door handle.

SUMMARY OF THE INVENTION

Problem to be Solved by the Invention

In general, for a motor apparatus with reduction gear structure installed in a door of a vehicle and used for a door locking mechanism or for a driving source of a door handle, a drip-proof structure or a waterproof structure is adopted, because the motor apparatus is used in an environment where rainwater enters.

For example, in the inventions described in Japanese Unexamined Patent pre-grant publications 2016-98629 and 2012-46989, measures to prevent dripping or waterproofing is provided by accommodating the entire motor apparatus with reduction gear structure in a case. Regarding to the door lock device subject of these inventions, since the motor apparatus with reduction gear structure is configured to drive a lock knob corresponding to the inside handle provided on the inner side of the door of the vehicle, the possibility of rainwater entering the motor part is quite low.

On the other hand, the pop-up mechanism of the door handle has a structure for driving an outside door handle provided on the outdoor side of the door. Therefore, when the outside door handle is operated in the rainy weather, for example, there is a possibility that the rainwater enters the portion of the motor apparatus with reduction gear structure from the outside door handle portion protruding outdoors through the transmission mechanism.

In addition, the interior of the door of the vehicle is under a severe circumstance with large temperature change when considering day and night or throughout the year, and there is a possibility that rainwater may enter inside the case of the motor due to pressure fluctuation caused by this temperature change. The penetration of rainwater causes degradation and breakdown of electric characteristics of the motor due to oxidation and corrosion of electrical parts.

In the interior of the door of the vehicle, there is a possibility that the temperature rises to about 85° C. when it receives direct sunlight in the outdoors in the summer. On the other hand, in the winter, the temperature inside the door will be below the freezing point, depending on a usage environment, it may reach up to −40° C.

Under such a severe usage environment with a large temperature difference, as the temperature rises, gas and moisture in the space for confining the DC motor expand and the pressure in the space increases. On the other hand, as the temperature decreases, the pressure in the space lowers as the gas and moisture shrink or condense or solidify. When the sealing of the space for confining the DC motor is insufficient, moisture in the door is sucked into the space and accumulated as the fluctuation of pressure in the confining space is repeated. This moisture causes oxidation and corrosion of electrical parts of the motor, which causes degradation and breakdown of electric characteristics of the motor.

For this reason, a motor apparatus with reduction gear structure used within the door of a vehicle where rainwater may intrude can't bear a long-term use unless the anti-waterproof measures are sufficient.

Although it is conceivable to take measures against rainwater by placing the whole of the pop-up mechanism of the door handle together with the lock device in a common casing inside the door, its feasibility is low considering the accommodation space inside the vehicle door. In addition, in the configuration placing in the common casing, it is difficult to prevent rainwater from entering the interior of the motor from the transmission mechanism portion connected to the outside door handle.

Japanese Unexamined Patent pre-grant publications No. 2015-31083 and No. 2014-95251 have no description of specific example concerning the waterproof measure of the motor portion of the pop-up mechanism of the outside door handle.

In view of the above-mentioned issues, it is an object of the present invention to provide a motor apparatus with reduction gear structure having a waterproof cover for a vehicle, capable of obtaining a high waterproof effect for the motor apparatus with reduction gear structure even under a usage environment such as the interior of a vehicle door where high possibility of rainwater infiltration with large temperature difference.

It is another object of the present invention to provide a motor apparatus with waterproof cover for a vehicle, having less restriction on the installation position of the motor apparatus with reduction gear structure installed in a door of a vehicle, and capable of reliably prevent degradation of electrical characteristics.

Means for Solving the Problems

A motor apparatus with waterproof cover for a vehicle of the present invention according to claim 1, comprising:

a motor having a cup-shaped motor case, an end cover fixed to the opening portion of the motor case, and a rotating shaft held by a bottom portion of the motor case and the end cover;

a reduction gear structure having a cup-shaped casing, an end bracket fixed to an opening portion of the casing, a reduction gear disposed inside the casing, an input shaft, and an output shaft, wherein the rotating shaft of the motor is the input shaft of the reduction gear structure, and the input shaft is coaxial with the output shaft; and a cup-shaped waterproof cover which is made of a transparent resin and is mounted on the outside of the motor case, wherein the end bracket of the reduction gear structure is fixed to the bottom portion of the motor case, wherein the cup-shaped waterproof cover comprises a cylindrical cap, a disk-shaped cap cover, a cap engagement portion, and a lead wire guide portion, wherein the cap engagement portion is provided on one end of the cylindrical cap and on the cap cover, and brings the cylindrical cap and the cap cover into mechanical engagement with each other, wherein the lead wire guide portion is formed between one end of the cylindrical cap and the cap cover, on a side opposed to the cap engagement portion across the center point of the cap cover, for inverting and leading out a motor power supply lead wire and a power supply connection connector into a U shape from the motor to the outside of the waterproof cover, and wherein the cylindrical cap is loosely fitted to the motor case, the motor apparatus further comprising:

a first seal portion made of a photocurable resin adhesive which is formed in the vicinity of a contact surface of the motor case with the reduction gear structure and fixes the cylindrical cap to the motor case and the end bracket;

a second seal portion made of a photocurable resin adhesive at the lead wire guide portion for fixing a part of the power supply lead wire to the lead wire guide portion; and a third seal portion made of a photocurable resin adhesive between the periphery of the one end of the cylindrical cap and the cap cover for fixing the cylindrical cap and the cap cover to each other.

The motor apparatus with waterproof cover for the vehicle of the present invention according to claim 2 has the following features in the invention according to claim 1, wherein the opening portion of the cylindrical cap in the vicinity of the contact surface is tapered, the outer diameter of the end bracket is an intermediate size between the outer diameter of the motor case and the outer diameter of the cylindrical cap, and the photocurable resin adhesive covers a surface on the outer side of the end bracket in the first seal portion.

The motor apparatus with waterproof cover for the vehicle of the present invention according to claim 3 has the following features in the invention according to claim 2, wherein the outer diameter of the motor case and the outer diameter of the easing of the reduction gear structure are different, wherein the end bracket has an outer annular portion and an inner annular portion in the radial direction, wherein, on the outer periphery of the outer annular portion, the easing of the reduction gear structure is press-fitted, and wherein the annular portion of the bottom portion of the motor case is press-fitted into the inner annular portion.

The motor apparatus with waterproof cover for the vehicle of the present invention according to claim 4 has the following features in the invention according to claim 2, wherein the cylindrical cap has a disk-like cap main body mounted on the outer periphery of the motor, wherein the lead wire guide part has a pair of guide rails provided on an outer periphery of one end of the cap body, and a lead wire guide groove covered with the guide rails, and wherein the length of the lead wire guide portion is 15 cm to 25 cm.

The motor apparatus with waterproof cover for the vehicle of the present invention according to claim 5 has the following features in the invention according to claim 2, wherein the cylindrical cap comprises:

a disk-shaped cap body mounted on the outer periphery of the motor, openings provided at both ends of the cap body, the lead wire guide portion provided on the outer periphery of one end of the cap body, and a cover fixing portion provided at one end of the cap main body, wherein the cover fixing portion has a cover engaging hole, wherein the cap cover has a fixing pin that engages with the cover engaging hole, wherein the cap engaging portion includes a cover engagement hole and the fixing pin, wherein the cap cover has a fixing pin that engages with the cover engaging hole, wherein the cap engaging portion is constituted by the cover engaging hole and the fixing pin, wherein the first seal portion, the second seal portion, and the third seal portion are configured so that a space for confining the DC motor in the waterproof cover has an adhesive strength capable of maintaining airtightness against a large pressure variation with respect to the atmospheric pressure.

The motor apparatus with waterproof cover for the vehicle of the present invention according to claim 6 has the following features in the invention according to claim 2, wherein the motor is a DC, motor apparatus with brush, wherein a pair of power supply terminals electrically connected to a pair of brushes extend from the inside to the outside of the end cover, and furthermore, along the outer surface of the end cover are bent so as to approach each other, and wherein the feeder lead wire is connected to the tip of the pair of power supply terminals.

The motor apparatus with waterproof cover for the vehicle of the present invention according to claim 7 has the following features in the invention according to claim 2, wherein the motor is a brushless DC motor driven by an inverter, and wherein a power supply lead wire connected to each stator coil via the inverter and a communication cable connected to an inverter drive control section for controlling the inverter are inverted into a U shape and lead out from the motor case through the lead wire guide portion to the outside of the waterproof cover.

The motor apparatus with waterproof cover for the vehicle of the present invention according to claim 8 has the following features in the invention according to claim 2, wherein the motor to which the reduction gear structure is fixed is a motor for driving the pop-up mechanism of the door handle of the vehicle, and wherein the motor to which the reduction gear structure is fixed is installed in the door casing inside the door of the vehicle.

Advantages of the Invention

According to the motor apparatus with waterproof cover for the vehicle of the present invention recited in claim 1, the DC motor apparatus can be enclosed in an enclosed space secured with airtight, with a simple structure of forming a first to a third seal portions by the photocurable resin adhesive in the gap surrounded by the waterproof cover, the motor case and the side face of the end bracket of the reduction gear structure.

Therefore, even when it is used in a door of a vehicle where there is a possibility of rainwater infiltration, it can withstand long-term pressure fluctuation and maintain airtightness and exert high waterproof effect on the motor.

Further, according to the invention recited in claim 1, since the lead wire guide portion can stably invert and extend the lead wire to the U shape, so that the restriction on the installation position of the DC, motor installed in the vehicle is reduced, and it is possible to reliably prevent degradation of electrical characteristics of the motor.

According to the invention recited in claim 2, since the light curable adhesive can cover not only the constrained air gap but also the outer surface of the end bracket, so that it can be provided a motor apparatus with waterproof cover for a vehicle which can increase the adhesive strength in the axial direction of the first seal portion and can prevent the waterproof cover from being detached to the right in the axial direction According to the invention recited in claim 3, a motor with high general versatility can be adopted even when the outer diameter of the DC motor and the outer diameter of the speed reduction mechanism are largely different from each other, and it is possible to provide an inexpensive motor apparatus with a waterproof cover for a vehicle.

According to the invention recited in claim 4, by the function of the lead wire guide portion along the axial direction of the DC motor, it can be suppressed the possibility of breakage of the power supply lead wire or the possibility of poor contact with power supply terminal.

According to the invention recited in claim 5, a motor apparatus with a waterproof cover for a vehicle capable of maintaining airtight against a large pressure variation with respect to the atmospheric pressure can be provided.

According to the invention recited in claim 6, a motor apparatus with a waterproof cover for a vehicle which is small in size and inexpensive, by adopting a DC motor with a brush can be provided.

According to the invention recited in claim 7, a motor apparatus with waterproof cover for a vehicle which can withstand use for a longer period of time can be provided.

According to the invention recited in claim 8, a motor apparatus with waterproof cover for a vehicle which has high waterproof effect and is suitable for the pop-up mechanism of the vehicle door handle can be provided.

DESCRIPTION OF THE EMBODIMENTS

Hereinafter, embodiments of the present invention will be described in detail with reference to the drawings.

Embodiment 1

Figure 1:
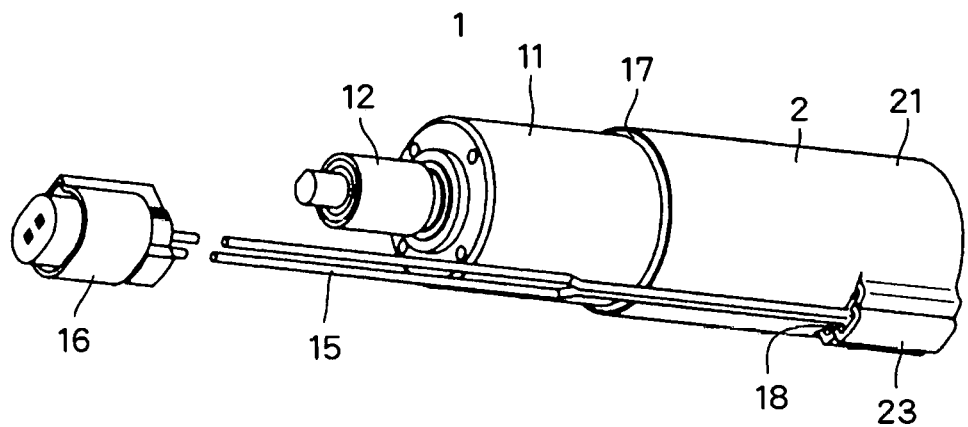
FIG. 1 is a front perspective view of a motor apparatus with waterproof cover for a vehicle according to the first embodiment of the present invention.
Figure 2:
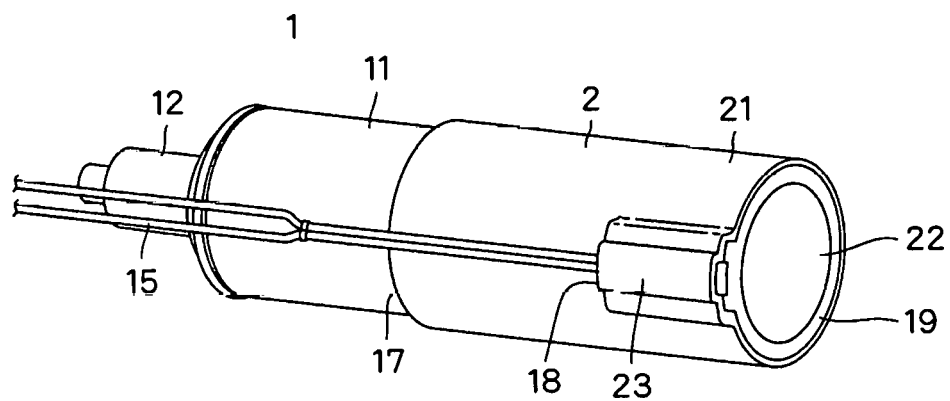
FIG. 2 is a rear perspective view of a motor portion with a reduction gear structure according to the first embodiment.
Figure 3:
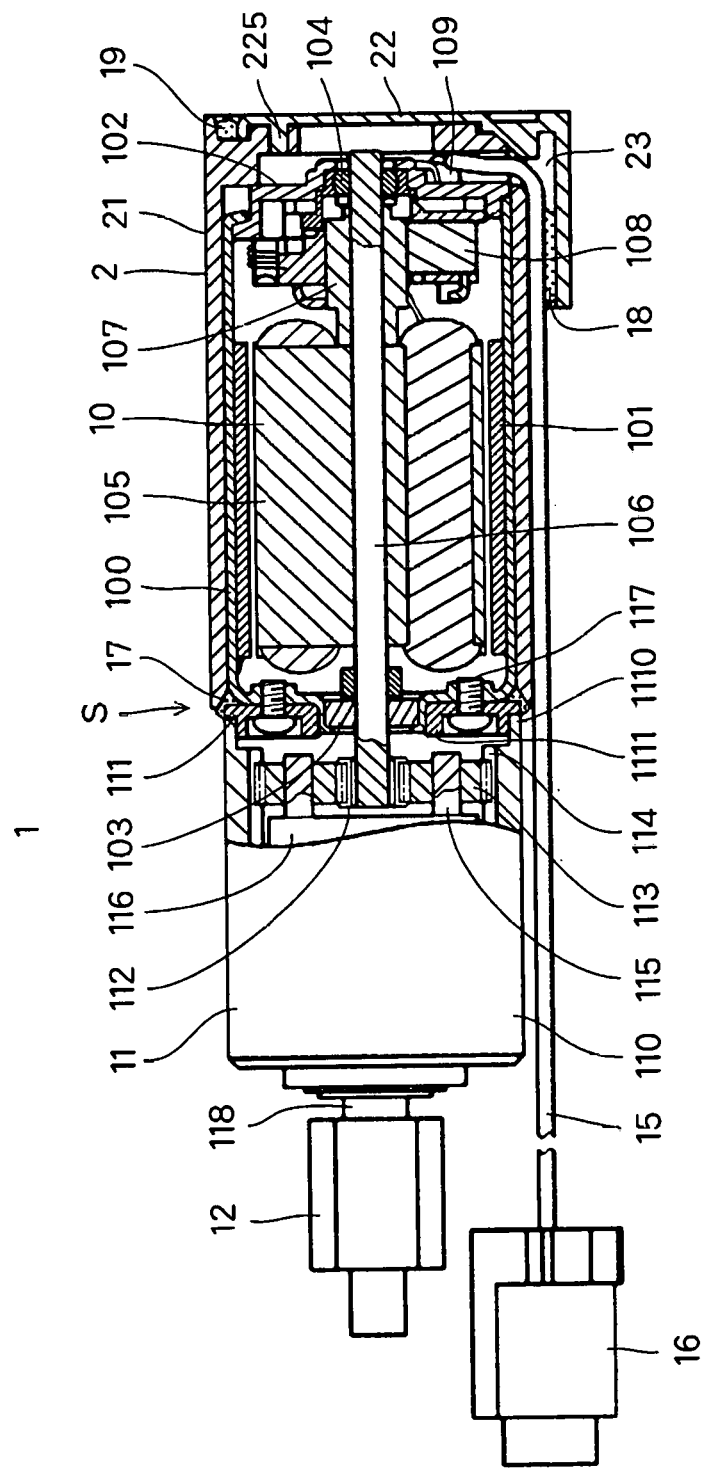
FIG. 3 is an enlarged vertical sectional front view of the motor portion with reduction gear structure according to the first embodiment.

FIG. 1 is a front perspective view showing a motor apparatus with a waterproof cover for a vehicle 1 according to the first embodiment of the present invention, FIG. 2 is a rear perspective view of a motor portion with a reduction gear structure in FIG. 1. FIG. 3 is an enlarged vertical sectional front view of the motor portion with reduction gear structure in FIG. 1.

The motor apparatus 1 with a waterproof cover for a vehicle is provided with a brush-equipped DC motor 10, and a reduction gear structure 11 connected to one end of the motor. The entire outer surface of the DC motor 10 up to the connecting portion with the reduction mechanism 11 is covered with a waterproof cover 2. Reference letter 12 is a pinion integral with the output shaft of the reduction gear structure 11, reference letter 15 is a pair of power supply leads that supply power from the battery to the DC motor 10 for driving the motor, and reference letter 16 is a power supply connector for connecting the power supply leads to a power supply.

The waterproof cover 2 comprises a cylindrical cap 21 covering the outer periphery of the DC motor 10, and a cap cover 22 covering the rear end surface of the DC motor 10. These two members are adhered and united to constitute a transparent cup-shaped waterproof cover 2. Further, the waterproof cover 2 has a lead wire guide portion 23 at the outer side thereof.

The cylindrical cap 21 and the cap cover 22 are made of material of a resin that is transparent, high in deformation temperature (for example, 90° C. or higher), high in mechanical strength, and excellent in adhesiveness. For this resin, for example, transparent polycarbonate or acrylic resin can be used.

In the embodiment of the invention, between the side surface of one end of the cylindrical cap 21 and a cover body of the cap cover 22, a cap engagement portion are formed. The cap engagement portion brings the cylindrical cap and the cap cover into a mechanical engagement relationship. The configuration of this cap engagement portion will be described later in detail.

Between the cylindrical cap 21 and the cap cover 22, on the side facing to the cap engagement portion with the center point of the cover body or the cap cover in between, a lead wire guide portion 23 is provided for inverting and leading out the motor power supply lead wire 15 and the power supply connector 16 into a U shape, from the motor to the outside of the waterproof cover.

According to the present invention, a surface where the DC motor 10 and the reduction gear structure 11 are in contact, that is, the surface on which the left side surface of the motor case 100 of the DC motor 10 and the outer side surface of the end bracket 111 of the reduction gear structure come into contact, is defined as a contact surface S (See FIG. 3).

A first seal portion 17 made of an ultraviolet curable adhesive or a visible light curable adhesive (hereinafter, a photocurable resin adhesive) is provided between the outer periphery in the vicinity of the contact surface S among the motor case 100 and the end bracket 111, and by the first seal portion, the cylindrical cap 21 is fixed to the motor case 100 and the end bracket 111.

Also, a second seal portion 16 made of a photocurable resin adhesive is formed at the inverting and leading out portion of the power supply lead wire 15 and the power supply connector 16, and by the second seal portion, a part of the power supply lead wire 15 is fixed to the lead wire guide portion 23.

Further, between the cylindrical cap 21 and the cap cover 22, a third seal portion 19 made of a light curable adhesive is provided. This sealing portion fixes the cylindrical cap 21 and the cap cover 22 to each other.

As the above adhesive, a low viscosity photocurable resin adhesive is desirable. As a result, it can be distributed the adhesive in the whole areas of the first to third seal portions to be bonded, thereby increasing the adhesive strength.

Even if a plurality of members are simply adhered each other with a photocurable resin adhesive, in a state where they are not mutually mechanically restrained, a sufficient adhesive strength can't be obtained, and it will not be obtained a structure that can withstand a high pressure fluctuation for a long time duration.

According to the present invention, first to third seal portions are formed in the gap surrounded by the mechanically constrained members, respectively.

First, regarding the first seal portion, the motor case 100 and the end bracket 111 are fixed with screws and they are in a mechanically constrained relationship with each other.

Further, since the cylindrical cap 2 is loosely fitted to the motor case 100 and its left end is in contact with die end bracket 111, so that these members are in a mechanically constrained relationship with each other. Therefore, high seal strength is secured at the first seal portion 17.

Next, the second to the third seal portions will be described.

First, between the side surface of one end of the cylindrical cap 21 and the cover body of the cap cover 22, the cap engagement portion in which the cylindrical cap 21 and the cap cover 22 are mechanically engaged with each other is formed.

Furthermore, between one end of the cylindrical cap 21 and the cap cover 22, and on the side facing the cap engaging portion across the center point of the cover body, a lead wire guide portion 23 is formed. The lead wire guide portion brings the cylindrical cap 21 and the cap cover 22 into a mechanical engagement relationship with each other. That is, the guide cover of the cap cover 22 is held in the guide rail, and the guide cover and the guide rail are in a mechanically constrained relationship with each other.

Therefore, a high adhesive strength is ensured also in the second seal portion 18 and the third seal portion 19. Note that these mutually mechanically constrained structures will be described later in detail.

The motor 10 of the present embodiment is a DC motor apparatus with brush. As shown in FIG. 3, in the DC motor 10, two poles permanent magnets 101 constituting the stator are fixed to the inner circumference side of the metallic cup-shaped motor case 100. A metallic end cover 102 is fixed to the opening portion (right end) of the cup-shaped motor case 100, a first bearing 103 is provided at the bottom (left end) of the motor case 100, and a second bearing 104 is provided on the end cover 102. Both ends of a rotating shaft 106 integral with a rotor 105 having an armature winding are supported by both bearings 103, 101, respectively. A pair of brushes 108 slidably contact with a commutator 107 are held by the brush holder, and those brushes are fixed to the rotating shaft 106. A pair of power supply terminals 109 electrically connected to the pair of brushes 108 are extend to the outside of the end cover 102. A pair of power supply lead wires 15 are connected to the power supply terminal 109.

Between the power supply connector 16 and the battery mounted on the vehicle, a controller (not shown) for controlling the power supplied to the DC motor 10 and the like are provided. When a signal line such as a sensor for current detection is connected between the DC motor 10 and the controller, the signal line is also provided inside and outside of the waterproof cover 2, like the power supply lead wire 15.

Also, the reduction gear structure 11 comprises a metallic cup-shaped casing 110, a metallic end bracket 111 which is press-fitted and fixed into the opening portion of the cup-shaped casing 110, and a reduction gears provided inside the casing 110. This reduction gear decelerates the rotation of the rotating shaft 106 of the DC motor 10, and is configured to transmit the rotation of the shaft to the pinion 12 fixed to the output shaft 118 protruding from the bearing at the bottom (left end) of the cup-shaped casing 110.

Inside the casing 110, a plurality of stages of reduction gears, for example, 3 stages of reduction gears, are provided continuously in the axial direction of the rotating shaft 106 (hereinafter referred to simply as the axial direction) of the DC motor 10, and the rotation of the DC motor 10 is decelerated (for example, 1/140), and is configured to transmit the rotation to the pinion 12. That is, this reduction gear has a sun gear 112 fixed to the end of the rotating shaft (input shaft) 106, and three of planetary gears 113 meshing with the sun gears 112 and an outer ring gear 114. A base (an output shaft) 116 that holds the axis of planetary gears 113 is an input shaft of the next stage of the reduction gear.

The end bracket 111 comprises a hollow disk-shaped body portion, a radially outer annular portion 1110 and a radially inner annular portion 1111 respectively extending from the body portion on the opposite side of the motor 10.

The bottom of the motor case 100 of the DC motor 10 protrudes axially outward at the central annular portion, and the first bearing 103 is fixed inside the annular portion. The outer periphery of the outer annular portion 1110 of the end bracket 111 is pressed into the opening end of the casing 110 of the reduction gear structure 11. The inner annular portion 1111 of the end bracket 111 of the reduction gear structure 11 is press-fitted to the outer periphery of the annular portion (bearing portion) of the bottom portion of the motor case 100. Further, the body portion of the end bracket 111 is fixed to the bottom portion of the motor case 100 by a plurality of screws 117.

In this way, the entire outer side of the motor 10, that is, the entire outer surface of the motor case 100 and the end cover 102 is covered with a cup-like waterproof cover 2 fitted to the outer periphery of the motor case 100 and the reduction gear structure 11. The region corresponding to the opening face of the waterproof cover 2 is covered with the end bracket 111 of the reduction gear structure 11 and the motor 10 itself. In other words, the space inside the motor case 100 of the motor 10 is an enclosed space entirely covered with the waterproof cover 2, the reduction gear structure 11, and the motor case itself.

Figure 6:
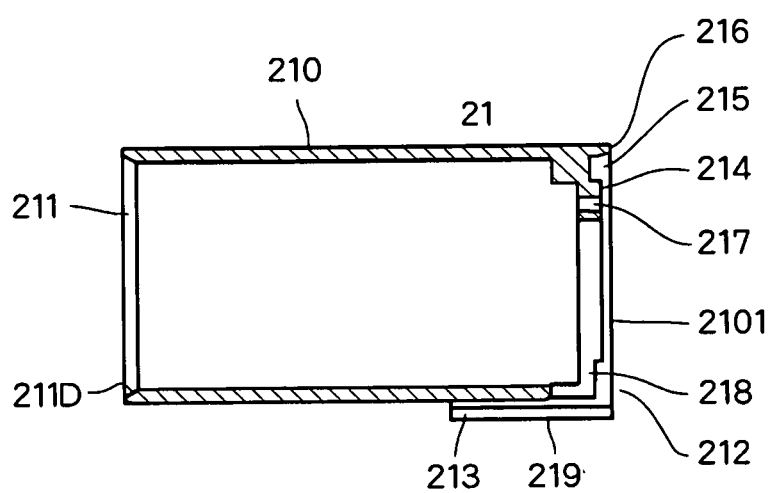
FIG. 6 is a longitudinal front view of a cylindrical cap in the first embodiment.

The cap main body 210 of the cylindrical cap 21 is extended its outer peripheral surface to the contact surface S between the DC motor 10 and the reduction gear structure 11, and has a tapered opening portion 211 whose opening area expands from the inside toward the tip portion (See FIG. 6). This tapered opening portion has a width in the axial direction of, for example, 1.0 mm to 1.2 mm, the inclination angle with respect to the axial direction is 30°.

In the embodiment of the invention, the outer diameter of the DC motor 10 and the outer diameter of the reduction gear structure 11 are substantially equal, in the vicinity of the contact surface S. More specifically, assuming that the outer diameter of the motor case 100 of the DC motor 10 in the vicinity of the contact surface S is D1 the outer diameter of the end bracket 111 of the reduction gear structure 11 is D2, and the outer diameter of the cylindrical cap 21 is D3, D1 is somewhat smaller than D2, and D2 is slightly smaller than D3. That is, they have the following relationship.

D1<D2<D3

In other words, the outer diameter of the end bracket of the reduction gear structure is an intermediate size between the outer diameter of the motor case and the outer diameter of the cylindrical cap.

As an example, D1=29.2 mm, D2=30.0 mm, D3=32.4 mm.

The thickness of the cylindrical cap 21 is 1.0 mm to 1.2 mm, for example, 1.5 mm. Between the inner peripheral surface of the cylindrical cap 21 and the outer peripheral surface of the motor case 100, there is a small clearance, for example, the order of 0.1 mm to 0.2 mm. That is, in a state before being fixed by the first seal portion 17, the cylindrical cap 21 is loosely fitted to the motor case 100, and they have a small clearance, that is, although mutual positional relationship in the radial direction is constrained, but it has a clearance in the axial direction that can be readily moved by hand.

Furthermore, the tapered opening portion 211 of the cylindrical cap 21 extends to the vicinity of the radial outside of the end bracket 111.

Because of these mutual relations, around the portion of the contact surface S between the motor 10 and the reduction gear structure 11, a gap of a predetermined size enclosed by the left side surface of the motor case 100, the outer side surface of the end bracket 111 of the reduction gear structure, and the tapered opening portion 211 of the cylindrical cap 21, that is a gap surrounded by mutually mechanically constrained members (a constrained gap) is formed.

In addition, by making the opening portion 211 of the cylindrical cap to be tapered, and setting the outside diameter of the end bracket 111 of the reduction gear structure to be the size between the outside diameter of the motor case and the outside diameter of the cylindrical cap, a narrow clearance is formed between the radially outer side of the end bracket 111 and the tapered opening portion 211 of the cylindrical cap 21, and this clearance opens the constrained gap to the outside of the end bracket 111 in the radial direction of the end bracket 111.

By filling the constrained gap with a photo-curable adhesive and irradiating ultraviolet light or visible light through the cylindrical cap 21 to the constrained gap portion, the adhesive is applied to each surfaces surrounding the gap, and the first seal portion 17 in which the adhesive adheres to each of surfaces surrounding the gap is formed. The tapered portion of the cylindrical cap 21 forms a predetermined volume of constrained gap and is necessary to ensure a large contact surface between the photocurable resin adhesive and the cylindrical cap 21.

In this way, since the photocurable resin adhesive can cover not only the constrained gap but also the outer surface of the end bracket 111, so that it can be increased the adhering strength in the axial direction at the first seal portion 17, and the waterproof cover 2 can be prevented from coming out to the right in the axial direction.

In the first seal portion 17, the tapered opening portion 211 of the waterproof cover 2 is mechanically bonded, by the photocurable resin adhesive, to the outer peripheral surface of the motor case 100 of the motor 10, and the side surface and the outer surface of the end bracket 111 of the reduction gear structure 11. Further, the first seal portion 17 seals the space inside the motor case 100.

Therefore, even if pressure fluctuation occurs in the space inside the motor case 100, the waterproof cover 2 still remains fixed to the motor case 100 and the end bracket 111, so that, it is prevented entering liquid such as rainwater inside the motor case 100 from the vicinity of the contact surface S between the motor 10 and the reduction gear structure 11.

Figure 5:
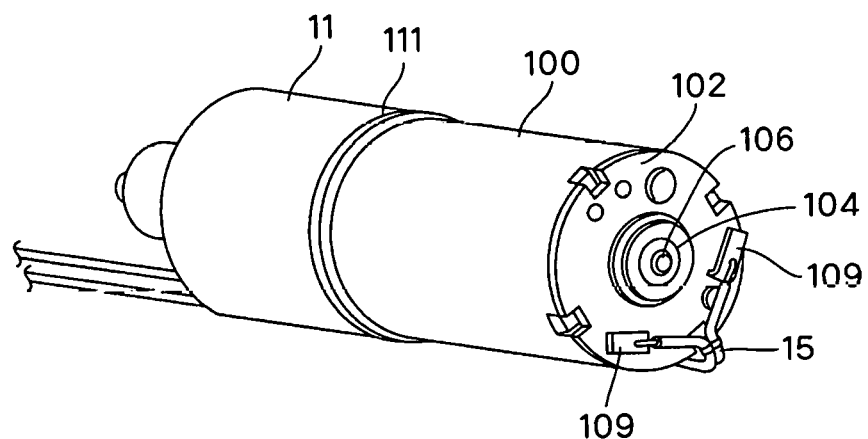
FIG. 5 is a rear perspective view of a portion of the speed reduction mechanism in the first embodiment, in a state the waterproof cover is removed.

The pair of power supply terminals 109 extending from the inside to the outside of the end cover 102 are bent so as to be along the outer surface of the end cover and close to each other (see FIG. 5). A power supply lead wire 15 is connected to tips of each bent portion of the power supply terminals, and a power supply connector 16 is connected to the other tip of the power supply lead wire 15.

Between the outer periphery of the cylindrical cap 21 and the cap cover 22, an inverting and leading out portion, that is, a lead wire guide portion 23 is provided. The lead wire guide portion is prepared for inverting and leading out the power supply lead wire 15 in a U shape from the inside to the outside of the DC motor 10, and further leading the power supply lead wire 15 and the power supply connector 16 along the axial direction of the DC motor 10.

In the lead wire guide portion 23, a gap surrounded by the cylindrical cap 21 and the cap cover 22, that is, a gap (constrained air gap) surrounded by mechanically constrained members is formed, and in this gap, there is provided the second seal portion 18 made of a photocurable resin adhesive.

The second seal portion 18 fixes the power supply lead wire 15 to the waterproof cover 2, and seals the space inside the motor ease 100, thereby, the second seal portion has a function to prevent liquid such as rainwater from entering inside the motor case 100 from the lead wire guide portion 23 of the motor 10.

Between the vicinity of the outer periphery of the cylindrical cap 21 of the waterproof cover 2 and the outer periphery of the cap cover 22, a gap is formed surrounded by the outer peripheral edge of the cylindrical cap 21 and the outer peripheral edge of the cap cover 22, that is, a gap surrounded by mechanically constrained members is formed. In this mechanically constrained gap, the third seal portion 19 made of a photocurable resin adhesive is formed. The third seal portion 19 fixes the cylindrical cap 21 and the cap cover 22, and also seals the space inside the motor case 100. So that, the third seal portion has a function to prevent, liquid such as rain water entering from the bottom of the cup-shaped waterproof cover 2 to the inside of the motor case 100.

The reduction gear structure 11 of the present invention is a coaxial type reduction gear which has an output shaft coaxially with the rotating shaft (output shaft) of the motor. That is, the input to the reduction gear structure from the DC motor 10 and the output from the reduction gear structure 11 are coaxial, so that various reduction ratios can be obtained by combining planetary reduction gears of various reduction ratios.

Since the waterproof cover 2 of the present invention has a simple configuration, in which the cover 2 is covered in the same axial direction as the rotating shaft of the DC motor from the direction opposite to the reduction gear structure 11 to the outside of the DC motor, so that a DC motor apparatus with reduction gear structure having a space-saving waterproof cover can be provided.

The reduction gear structure 11 may be a reduction gear structure of a coaxial type, and is not limited to the form described in the embodiment of the invention.

It should be noted that instead of inverting and extending the lead wire guide portion in the U shape for extending the power supply lead wire 15 from the inside to the outside of the DC motor 10, the lead wire guide portion may be linearly extended to the rear along the axial direction of the DC motor 10.

In this assumption, it is necessary to provide a cutout portion in the cap cover 22 for passing the power supply lead wire 15 having the power supply connector 16, and in the bottom portion of the cup-shaped waterproof cover 2, it is necessary to separately provide a seal portion for sealing the cutout portion. Further, it is necessary to ensure the adhesive strength of the notch. Still more, if the power supply lead wire 15 is stretched backward along the axial direction of the DC motor 10 and is extended as it is, the degree of freedom of the extension part of the power supply lead wire 15 from the fixed part is large. Therefore, there is a possibility that breakage of the extended portion of the power supply lead wire 15 due to the action of external force, and poor contact between the power supply lead wire 15 and the power supply terminal 109 may occur.

On the other hand, according to the present invention, by the function of the lead wire guide portion 23, the power supply lead wire 15 is invert and extend the lead wire to the U shape from the inside to the outside of the DC motor 10, and is lead along the axial direction of the DC motor 10. So that, the possibility of breakage of the power supply lead wire 15, and the possibility of poor contact with the power supply terminal 109 are suppressed to a low level.

Further, as shown in the FIG. 2, since the second sealed portion 18 provided in the lead wire guide portion 23 and the third seal portion 19 provided in the fixed portion on the back face of the cylindrical cap 21 are formed as a continuous annular seal portion, when the cover 2 is seen from the direction of its bottom part, so that, despite the existence of the lead wire guide portion, the bottom portion of the waterproof cover 2 has sufficient strength secured.

The lead wire guide portion 23 for inverting and leading out the power supply lead wire 15 is a configuration that takes into consideration restrictions on the installation space, when the motor apparatus with waterproof cover for the vehicle of the embodiment is incorporated into the door body of a vehicle. This point will be explained with reference to FIG. 4.

Figure 4:
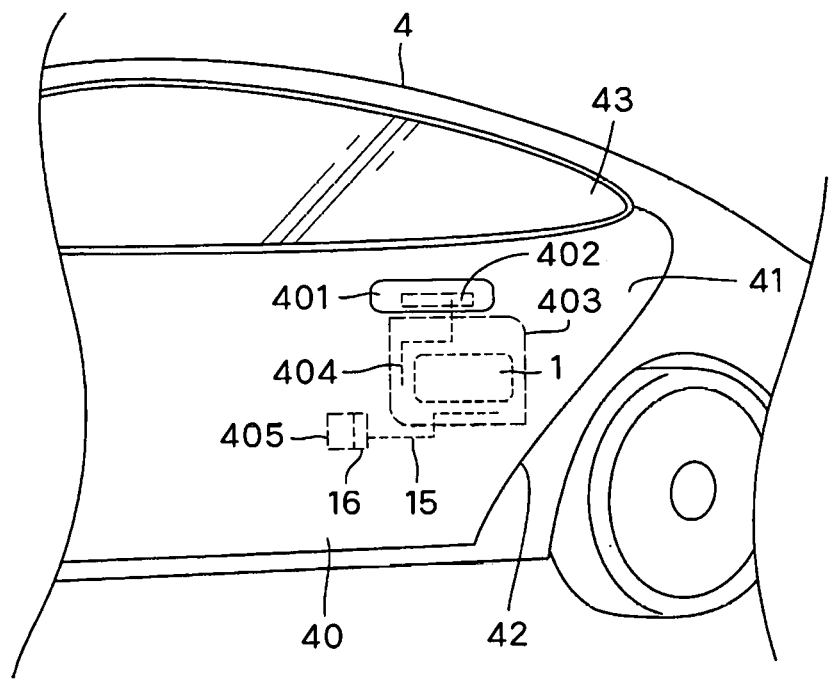
FIG. 4 is a diagram showing overview of an example of the motor apparatus with waterproof cover for the vehicle according to the first embodiment, adopted as a driving source of a pop-up mechanism for a door handle of a vehicle.

FIG. 4 is a drawing showing an embodiment of the present invention, in which the motor apparatus with the waterproof cover for the vehicle of the embodiment is adopted as a drive source of a pop-up mechanism of a door handle.

The door body 40 of the vehicle 4 has a space formed between the outer panel 41 on the outer side of the vehicle and the inner panel on the inner side of the vehicle.

Reference letter 42 shows a rear end face of the door body. On the upper portion of the door body 40, a window glass 43 is disposed so as to be movable up and down. An outside door handle 401 with a pop-op mechanism 402 is provided on the outer panel 41.

The pop-up mechanism 402 has a door casing 403 fixed to the inner wall of the outer panel 41, a motor apparatus with the reduction gear 1 installed in the door casing 403, and a transmission mechanism 404 that is driven via a pinion 12 at the output end of the motor apparatus with the reduction gear 1.

The transmission mechanism 404 includes a bell crank which is driven by the pinion 12 and swings in the width direction of the door, a cam which is fixed to the rotating shaft of the outside door handle 401 and is driven via a bell crank, and the like.

A waterproof structure, described in Japanese Unexamined Patent pre-grant publication No. 2012-46989 for example, is provided around the portion where the door casing 403 is fixed to the inner wall of the outer panel 41 so as to cover the whole of the motor apparatus with the reduction gear 1.

The power supply lead wire 15 for supplying electric power to the motor apparatus with the reduction gear 1 is connected to the power feed coupler 405 installed in the space inside the door via the connector 16. The power supply coupler 405 is connected to a battery mounted on a vehicle via a cable.

A controller (not shown) for controlling the pop-up mechanism 402 is provided between the battery and the power supply coupler 405. The controller receives a manipulation command from the mobile terminal of the user or a signal such as a touch sensor responding to the operation of the user, controls electric power supplied to the DC motor 10, and drives the DC motor in a predetermined direction for a predetermined time, so that the position of the outside door handle 401 is changed. A known door lock mechanism is also installed in the space of the door main body 40.

The outside door handle 401 is configured to be displaceable between positions a storing position where the outside door handle is stored at the same height as the outer surface of the door body 40, a pop-up position where the user can grasp the outside door handle by user's hand, and a full stroke position when the handle is opened by user's hand. That is, the outside door handle 401 is displaced between the storing position, the pop-up position, and the full stroke position with respect to the surface of the door body, by a user's command from the terminal or a touch operation by user's hand.

Regarding the relationship between the door handle, the pop-up mechanism and the door locking mechanism, with the citation of the descriptions of Japanese Unexamined Patent pre-grant publications No. 2015-31083 and No. 2014-95251, it is substituted the detailed explanation of their structure.

As the outside door handle 401 is displaced to a pop-up position or to a full stroke position by the pop-up mechanism or the like, there is a possibility that rainwater will intrude into the door casing 403 via the portion of the transmission mechanism.

Therefore, it is desirable to install the motor apparatus with the reduction gear 1 in the lateral direction (horizontal direction) inside the door casing 403 or slightly downward on the pinion 12 side of the motor.

As a result, it can be configured to prevent rainwater from entering into the interior of the motor 10 located at a position opposite to the pinion 12 with the reduction gear structures 11 interposed there between, even if rainwater enters the inside of the door casing 403 from the upper side and further reaches the pinion 12 via the bellcrank.

In addition, as the window glass 43 moves in and out of the space inside the door body 40, there is a possibility that rainwater intrudes. Even with this condition, by installing the motor apparatus with the reduction gear 1 in the inside of the door casing 403 in a sideways manner, it can be configured to prevent rainwater from entering into the interior of the motor 10 located opposite the pinion 12 with the reduction gear structure interposed there between.

Further, in some circumstances, it may be desirable the motor 10 of the motor apparatus with the reduction gear 1 to disposed on the side close to the rear end face 42 of the door body, in the positional relationship between the rotating shaft of the door handle and the pop-up mechanism, and the pinion 12 is disposed closer to the center side of the door body. On the other hand, below the door casing 403, various members related to the door locking mechanism are installed.

Therefore, if the power supply coupler 405 can be provided on the center side of the door body more than the rear end face 42 of the door body, the advantage can be obtained that the degree of freedom of the installation position of the motor apparatus with the reduction gear 1 in the door of the vehicle is greatly increase.

For the above reasons, the power supply lead wire 15 of the motor apparatus with the reduction gear 1 stored in the vehicle door is desirable to have a lead wire guide part 23 in which the lead wire 15 is drawn out from the inside to the outside of the DC motor 10 and is further invert and extend the lead wire to the outside in a U shape along the axial direction of the DC motor 10.

Next, the explanation will be supplemented with respect to the elements constituting the motor apparatus 1 with the reduction gear in the first embodiment.

FIG. 5 is a perspective view of the part of the motor 10 and the reduction gear structure 11 in the first embodiment, in which the waterproof cover is removed.

The end cover 102 is fixed to the opening portion of the cup-shaped motor ease 100 of the motor 10. Further, the pair of power supply terminals 109 extending from the inside of the end cover 102 to the outside are bent so as to be extended along the outer surface of the end cover and close to each other, and at the tip of each power supply terminal 109, the power supply lead wire 15 is connected.

In the circumstance of the motor 10 alone, in general, it is desirable to provide a feeding structure such as a brush or a feeding terminal 109 on the bottom side of the cup-shaped motor case 100 as the waterproof structure.

However, in the motor apparatus with the reduction gear of the present embodiment, in order to directly couple the reduction gear structure 11 having a large speed reduction ratio to the output side of the DC motor 10, the end bracket 111 of the reduction gear structure 11 is fixed integrally to the bottom side of the motor case 100.

In this circumstance, there is no room for providing a power supply structure such as a brush on the bottom side of the motor case 100, and therefore it is necessary to provide a power supply structure such as a brush on the opening side of the motor case 100, that is, the side of the end cover 102.

Figure 7:
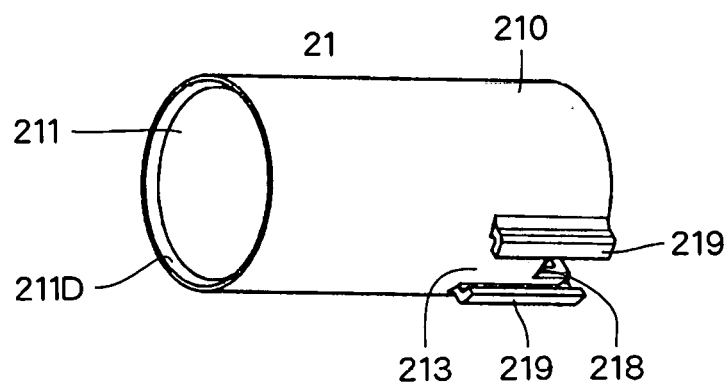
FIG. 7 is a front perspective view of the cylindrical cap in the first embodiment.
Figure 10:
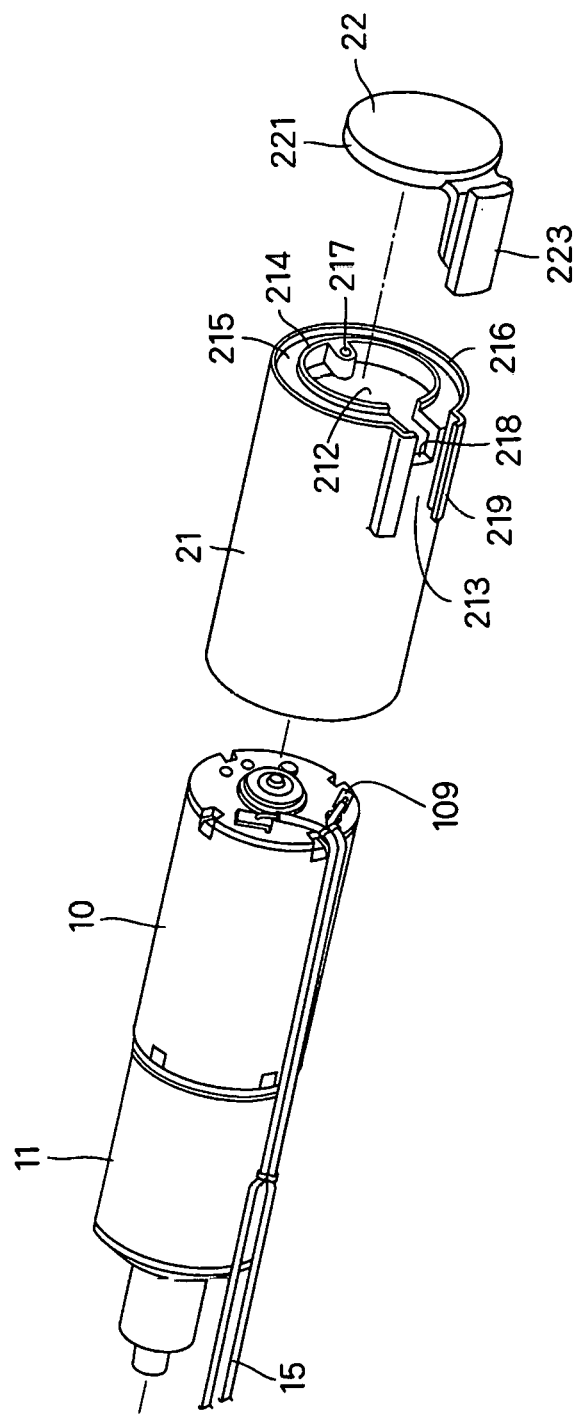
FIG. 10 is an exploded perspective view showing a positional relationship between the motor with the deceleration mechanism, the cylindrical cap, and the cap cover before assembly.

Next, the configuration of the cylindrical cap 21 will be described with reference to FIGS. 6, 7 and 10. FIG. 6 is a longitudinal frontal section view of the cylindrical cap, and FIG. 7 is a perspective view of the cylindrical cap. In addition, FIG. 10 is an exploded perspective view of the front of the cover showing the mutual relationship between the motor apparatus with the reduction gear, the cylindrical cap, and the cap cover, before assembling the motor apparatus with the waterproof cover for the vehicle.

The cylindrical cap 21 includes a cover fixing portion 212 provided at one end of the cylindrical cap main body 210 and to which the cap cover 22 is fixed, an opening portion 211 provided at the other end of the cylindrical cap main body 210, and a lead wire guide groove 213.

The opening portion 211 is a tapered opening portion where cross sectional area increases toward the opening side. The cover fixing part 212 has an annular inner flange 214 along the opening portion 2101 at one end of the cap main body 210, an outer cover engagement groove 215 on the outer side of the inner flange, and an outer flange 216 on the outer side of the groove.

In addition, a cover engagement hole 217 is formed in a cylindrical portion in which a part of the inner flange 214 is extended radially inward. In addition, at the position corresponding to the lead wire guide groove 213, a part of the inner flange 214, the cover engagement groove 215, and the outer flange 216 are cut respectively cut to form a lead wire through hole 218.

Both side surfaces in the axial direction of the lead wire guide groove 213 are covered with a pair of guide rails 219 integrally formed with the cap main body 210. The cover engagement hole 217 and the lead wire guide groove 213 are provided on the side opposed to each other across the center line of the cap main body 210.

Figure 8:
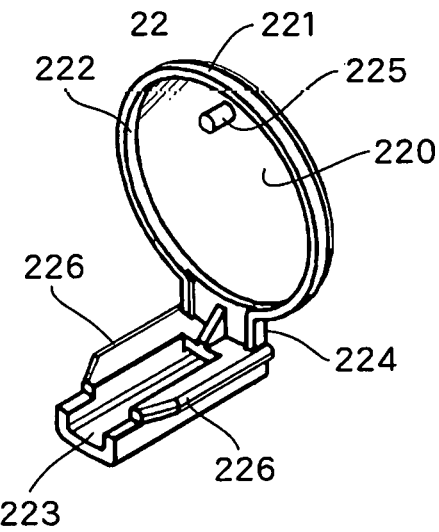
FIG. 8 is a front perspective view of a cap cover in the first embodiment.
Figure 9:
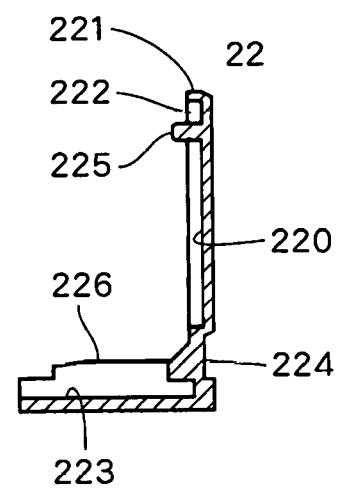
FIG. 9 is a longitudinal front view of the cap cover in the first embodiment.

Next, the configuration of the cap cover 22 in the first embodiment 1 will be described with reference to FIGS. 8 to 10. FIG. 8 is a perspective view of the cap cover 22, and FIG. 9 is a longitudinal side view of the cap cover.

The cap cover 22 comprises a disk-shaped cover body 220, an annular outer edge portion 221, an inner cylindrical cap engagement groove 222, a lead wire guide groove 223 formed by extending from a part of the annular outer edge portion 221 in a direction perpendicular to the cover body 220, a connecting portion 224, and a fixing pin 225. Further, the periphery of the lead wire guide groove 223 is an axial guide cover 226 that covers the power supply lead wire. The guide cover 226 is configured to engage the guide rail 219 of the cylindrical cap 21.

The annular outer edge portion 221 is located at a position corresponding to the cover engagement groove 215 of the cylindrical cap 21, the fixing pin 225 is at a position corresponding to the cover engagement hole 217, and the lead line guide groove 223 is at a position corresponding to the lead engagement groove 213. In other words, the lead wire guide groove 223 and the fixing pin 225 are provided on the side opposing the center point of the cover body 220.

The cover engagement hole 217 and the fixing pin 225 constitute the can engagement portion that brings the cylindrical cap 21 and the cap cover 22 into mechanical engagement with each other.

The configuration of the cap engaging portion is not limited to this example. The configuration may be anything as long as the cylindrical cap and the cap cover can maintain the engagement relationship with each other on the side facing the lead wire guide groove 213.

When the cylindrical cap 21 and the cap cover 22 are integrated, the annular outer edge 221 of the cap cover 22 is located in the cover engagement groove 215 sandwiched between the inner flange 214 and the outer flange 216 of the cylindrical cap 21, and the inner flange 214 is positioned within the cylindrical cap engagement groove 222.

When the cylindrical cap 21 and the cap cover 22 are integrated, the part comprising the lead wire guide groove 213 and the guide rail 219 of the cylindrical cap 21, the lead wire guide groove 223 and the guide cover 226 of the cap cover 22 constitutes a lead wire guide part 23.

The function of the lead wire guide portion 23 is to stably invert and extend the lead wire to the outside in a U shape, and is to prevent an unexpected external force from acting on the lead wires 15 during the manufacturing process or mounting and the like, thereby preventing electrical contact failure between the power supply terminal 109 and the lead wire 15.

The length of the lead wire guide portion 23 in the axial direction may be any length as long as it is necessary and sufficient to realize the above function, for example, 15 mm to 25 mm.

Next, referring to the FIGS. 11A to 11D, the assembling process of the motor apparatus with the waterproof cover for the vehicle 1 in the first embodiment will be described.

Figure 11A:
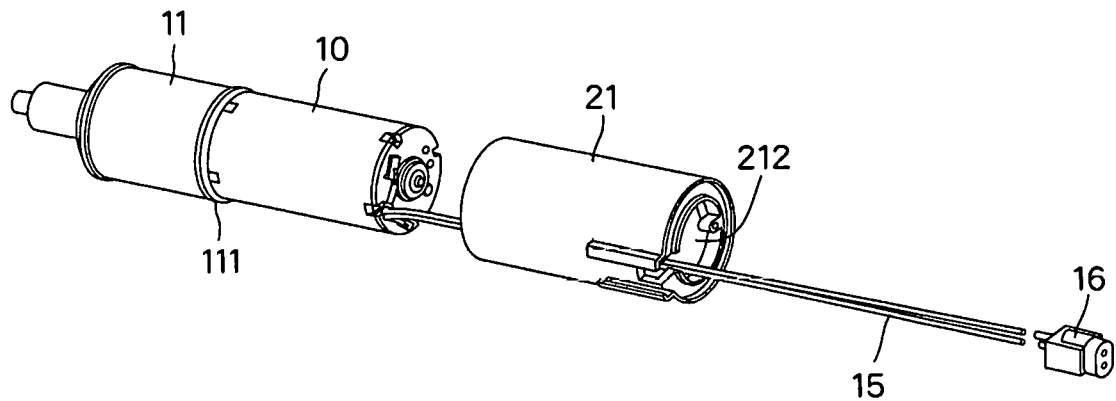
FIG. 11A is a perspective view far explaining an assembling process in the first embodiment.
Figure 11B:
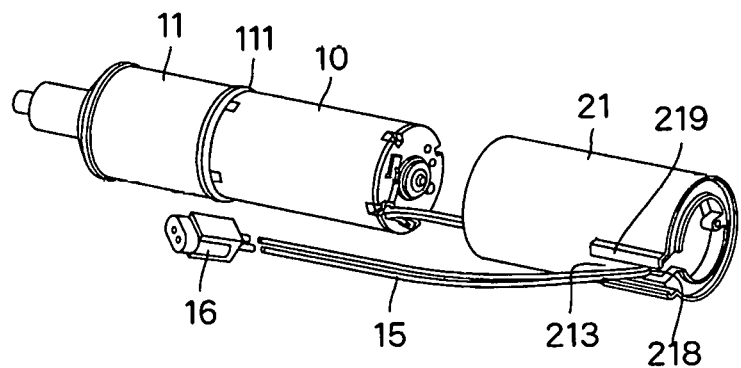
FIG. 11B is a perspective view for explaining the assembling process in the first embodiment.

First, as shown in the FIG. 11A, the lead wire 15 and the connector 16 of the DC motor 10 are drawn to the outside in the right direction through the inside of the cap main body 210 of the cylindrical cap 21. Next, as shown in FIG. 11B, the lead wire 15 is passed through the lead wire conducting hole 218, into the lead wire guide groove 213 inside the guide rail 219, so that the lead wire 15 and the connector 16 are inverted and extend in the U shape.

Figure 11C:
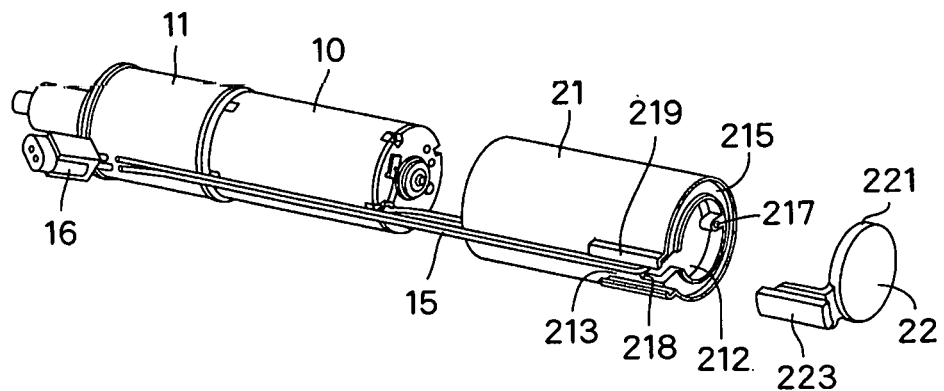
FIG. 11C is a perspective view for explaining the assembling process in the first embodiment.

Next, as shown in FIG. 11C, a photocurable resin adhesive is applied to the outer peripheral portion in the vicinity of the contact surface S between the DC motor 10 and the reduction gear structure 11, that is, the right side surface of the end bracket 111 and the outer peripheral portion of the left end of the DC motor 10.

In addition, a photocurable resin adhesive is applied to the cover engagement groove 215 of the cover fixing portion 212 of the cylindrical cap 21, the cylindrical cap engagement groove 222 of the cap cover 22, the lead wire guide groove 213, and the guide cover 226, etc. As the adhesive, an ultraviolet light curable adhesive is desirable.

Then, the cylindrical cap 21 is pushed to the outside of the DC motor 10 until its tapered opening portion comes close to the side face of the end bracket 111, and the cap cover 22 is attached to the cylindrical cap 21, after then, the whole of them are irradiated with UV light or visible light to cure the adhesive in each seal portion. Since the cylindrical cap 21 and the cap cover 22 are made of a transparent resin, it is easy to cure the adhesive by UV light or visible light.

Figure 11D:
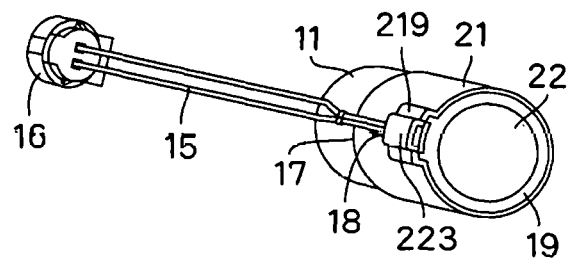
FIG. 11D is a perspective view for explaining the assembling process in the first embodiment.

According to the present invention, as shown in FIGS. 3 and 11D, in to the space surrounded by the mechanically constrained members, that is, into the space surrounded by the left end of the cylindrical cap 21, the outer periphery of the motor case 100, the side face of the end bracket 111 of the reduction gear structure, photocurable resin adhesive is applied and adhere them.

By adhering, with the photocurable resin adhesive, the cylindrical cap 21, the motor case 100, and the end bracket 111, a first seal portion 17 is formed which can withstand high pressure variation for a long period of time.

Similarly, into the space between the cylindrical cap 21 and the lead wire guide portion 23 where is mechanically restraining each other, by applying the photocurable adhesive and adhering them to each other, it can be provided the second seal portion 18 which can withstand a high pressure fluctuation a long period of time is formed.

Furthermore, into the space between the engagement portion provided around the opening portion at one end of the cylindrical cap 21 and the cap cover 22 which are mechanically restrained to each other, by applying the photocurable resin adhesive and adhering them to each other, the third seal portion 19 which can withstand high pressure fluctuation for a long time is formed.

As described above, according to the motor apparatus with the waterproof cover for the vehicle of the present invention, with a simple structure in which the first to third seal portions are formed in the gap surrounded by the waterproof cover, the motor case and the side face of the end bracket of the reduction gear structure, and surrounded by mutually mechanically constrained members, it can be sealed the DC motor in the airtight space.

Therefore, even in the usage environment inside a vehicle door, it can withstand long-term pressure fluctuations and maintain airtightness, and can exhibit high waterproof effect for the motor.

That is, the periphery of the DC motor 10 is completely covered with the waterproof cover 2 and the reduction gear structure 11, and furthermore, it is secured airtight by the first seal portions 17, the second seal portion 18, and the third seal portion 19, mechanically constrained to each other.

Therefore, even if rainwater intrudes into the inside of the door casing 403 from the pop-up mechanism portion of the door handle and furthermore reaches the pinion 2 via the bell crank, rainwater does not intrude into the interior of the motor 10 at a position opposite to the pinion 12 across the reduction gear structures.

In addition, the first to third seal sections 17-19 are structured to withstand the pressure change in the space confining the DC motor 10 under the assumed usage conditions.

As mentioned above, there is a possibility that the temperature inside the door of a vehicle rises to about 85° C. when it receives direct sunlight in the outdoors in the summer or the like.

On the other hand, in winter, the temperature may reach below freezing, depending on the usage environment, to −40° C.

In order to withstand such a usage environment, the motor apparatus with waterproof cover for the vehicle of the present invention, it is configured to be able to maintain sufficient airtightness, even if the space for confining the DC motor 10 has a high pressure variation of, for example, about 80 KPa with respect to the atmospheric pressure, so that airtightness can be sufficiently maintained.

For example, if the motor apparatus with waterproof cover for the vehicle according to the present invention is cooled from an ambient temperature (20° C.) environment where moisture is present in the surrounding atmosphere to −40° C., then the motor apparatus is left in this state for 5 minutes, no water leakage will be occurred from the first to third seal portions.

Furthermore, even if the following cycle is repeated for the environment in which the motor device is placed, no water leakage occurs from the first to third seal portions of the motor device, where the repeated cycle is; starting from the state of ambient temperature, heating to 85° C. and leaving it, then return to ambient temperature, further, cool down to −40° C. and leaving, after then return to the state of ambient temperature.

When the space for confining the DC motor 10 is cooled from an environment of ambient temperature (20° C.) to the environment of −40° C., a high pressure fluctuation of about −80 KPa occurs. In addition, even when heating from the environment of ambient temperature (20° C.) to the environment of 85° C., a pressure fluctuation of about 80 KPa occurs.

As described above, the motor apparatus with the waterproof cover for the vehicle of the present invention has the material and thickness of the cylindrical cap 21 and the cap cover 22 of the waterproof cover 2, and the adhesive strength of the first to third seal portions 17-19 are constructed to be able to withstand pressure fluctuations over a long period of day/night or daily, over a long period of time.

It is desirable to set the adhering strength of the first to third seal portions is such that, when the pressure in the space confining the DC motor apparatus becomes abnormally high due to factors other than assumed, one of the first to third seal portions is damaged and release the internal pressure to a value that does not damage the waterproof cover or the motor apparatus with the reduction gear.

According to the experiments of the inventors, when a waterproof structure made of a rubber O-ring or packing is adopted in place of the first to third seal portions 17-19, due to the pressure fluctuation based on the temperature change, the rubber expands and contracts, so that ambient moisture permeates into the space sealed by the rubber seal in a relatively short period of time.

On the other hand, it is confirmed that, as in the present invention, forming the first to third seal portions by applying the photo-curable adhesive to each space surrounded by the mechanically constrained members respectively, and adhering the mechanically constrained members to each other, airtightness can be maintained for a long period of time even when the above-described high pressure fluctuation is caused.

Further, since the lead wire guide portion 23 for stably inverting and extending the lead wire to the U shape is provided and this portion is bonded with the photocurable resin adhesive to form the second seal portion, the restriction on installation position of the coupler of the lead wire 15 to the connector 16, that is the restriction on the installation position of the motor, becomes smaller.

Furthermore, in the manufacturing process, mounting, etc., it can also be prevented from occurring an unexpected external force acts on the lead wire 15, and an electrical contact portion is brought into contact failure, between the power supply terminal 109 and the lead wire 15 in the airtight sealed space.

As described above, the motor apparatus with waterproof cover for the vehicle according to the present embodiment can contain the DC motor in an enclosed space secured airtight with a simple configuration.

In addition, even in the presence of moisture in the sealed space and in the usage environment in a vehicle with large temperature change, it can withstand large pressure fluctuations acting on this sealed space and obtain high waterproof effect for the motor.

In addition, since the lead wire guide portion is configured to stably invert and extend the lead wire to the U shape, the restriction on the installation position of the DC, motor installed in the vehicle is reduced, and it can be reliably prevented deterioration of the electrical characteristics.

Also, by adopting a DC motor apparatus with brush, there is the effect that it can be provided a motor apparatus with waterproof cover for the vehicle which is small in size and inexpensive.

Embodiment 2

Next, the second embodiment of the present invention will be explained.

Figure 12:
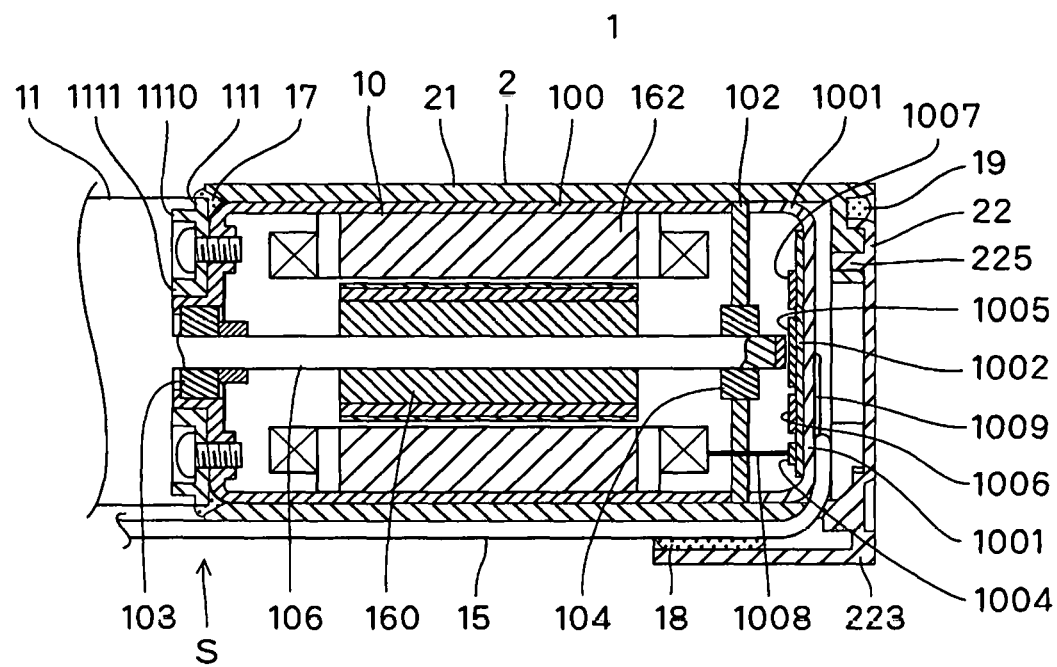
FIG. 12 is an enlarged vertical sectional front view for showing detail of the motor portion with reduction gear structure according to the second embodiment.

The waterproof cover of the present invention can also be adopted for a motor of a different type from that described in the first embodiment the second embodiment is an example in which the waterproof cover of the present invention is applied to a brushless DC motor. FIG. 12 is a longitudinal front view showing details of the motor part with a reduction gear structure of the second embodiment.

A motor apparatus with a waterproof cover for a vehicle 1 is provided with a brushless DC motor 10 and a reduction gear structure 11 connected to one end of the DC motor. Like the first embodiment, the brushless DC motor 10 is covered with a transparent waterproof cover 2 on the entire outer surface up to the connecting portion with the reduction gear structure 11.

In this embodiment, the brushless DC motor 10 is an inner rotor type three-phase brushless DC motor. An end cover 102 is fixed to the opening portion of the motor case 100, and a rotating shaft 106 is rotatably hold on the pair of hearings 103, 104 provided in the motor case 100 and the end cover 10.

A rotor 160 having a multipolar permanent magnet is integrally formed with the rotating shaft 13. A plurality of stator coils 162 constituting the 3 phase (U phase, V phase, W phase) of the brushless DC motor 100 are fixed to the inner surface of the motor case 100. On the outside of the end cover 102, a protective cover 1001 for holding a printed circuit board 1002 is fixed. On the printed circuit board 1002, an inverter 1004 for controlling the current supplied to the stator coil 162, a sensor circuit 1005 functioning as a rotary encoder of the rotor 160, an inverter drive control section 1006 for controlling the inverter 1004, and a current detection section 1007 for detecting the current flowing through the stator coil 162, etc. are provided.

The inverter drive control section 1006 drives the inverter 1004 based on a command from the control unit (not shown), controls the phase of the current supplied to the stator coils 162, and rotates the rotor 160. The control unit controls electric power and current supplied to the inverter 1004 based on the phase of the rotor 160 detected by the sensor circuit 1005 and the current detected by the current detection unit 1007. To each of the stator coils 162, a sinusoidal wave drive current is supplied from a battery mounted on the vehicle via the connector 16, the power supply lead wire 15, then inverter 1004, and a power supply cable 1008. In addition, information data are transmitted to each of the sensor circuit 1005, the inverter drive control unit 1006, and the current detection unit 1007, and the control unit via a communication cable 1009. The communication cable 1009 is configured so as to be guided from the inside of the protective cover 1001 to the lead wire guide portion 23 together with the power supply lead wire 15, and then inverted and led out to the outside of the motor case 100.

In the second embodiment, as well as the first embodiment, a first seal portion 17 made of a photocurable resin adhesive is formed near the contact surface S between the outer periphery of the motor case 100 and the reduction gear structure.

A second seal portion 18 made of a photocurable resin adhesive is formed in the guide portion 23, between the cylindrical cap 21 and the cap cover 22, that is an inverting and leading out portion of the power supply lead wire 15 and the communication cable 1009.

A third seal portion 19 made of a photocurable resin adhesive is formed between the engagement portion provided around the opening portion at one end of the cylindrical cap 21 and the cap cover 22.

It goes without saying that the present invention can also be applied even when the inverter 1004 is arranged outside motor case 100 and power is supplied h three power feed lead wires 15. Also, it goes without saying that the present invention can be applied even when an AC motor is adopted instead of the DC motor.

When the brushless DC motor is used as the drive source of the pop-up mechanism, the time for which the brushless DC motor continuously rotates to operate the pop-up mechanism is short, so the amount of heat generated by the inverter 1004 and the inverter drive control section 1006 is small. Therefore, the deterioration of the electrical characteristics of the inverter 1004 and the inverter drive control section 1006, which accompanies the structure in which the brushless DC motor is sealed in the enclosed sealed space, is negligible.

According to the motor apparatus with the waterproof cover for the vehicle of the second embodiment, like the first embodiment, it can also seal the brushless DC motor in the enclosed space secured airtight, with a simple configuration.

Therefore, even in the usage environment in which moisture exists in the surroundings and the temperature difference is large, it can withstand a large pressure difference acting on the enclosed space where the motor is to be sealed, and a high waterproof effect for the motor can be obtained.

Further, since the lead wire guide portion is configured to stably invert and extend the lead wire to the U shape, limitation on the installation position of the DC motor is reduced, and the degradation of the electric characteristic is reliably prevented.

In addition, as a characteristic of the motor itself, it can be provided a motor apparatus with waterproof cover for a vehicle which can withstand use for a longer period by adopting a brushless DC motor having better electrical characteristics than a DC motor apparatus with brush.

Embodiment 3

In the first embodiment and the second embodiment, it is assumed that the outside diameter of the DC motor 10 and the outside diameter of the reduction gear structure 11 are substantially equal.

However, the present invention is not limited to this premise, and can also be applied to the circumstance where the outer diameter of the DC motor 10 and the outer diameter of the reduction gear structure 11 are greatly different.

The third embodiment is an example where the outer diameter of the DC motor 10 is considerably larger than the outer diameter of the reduction gear structure 11.

Figure 13:
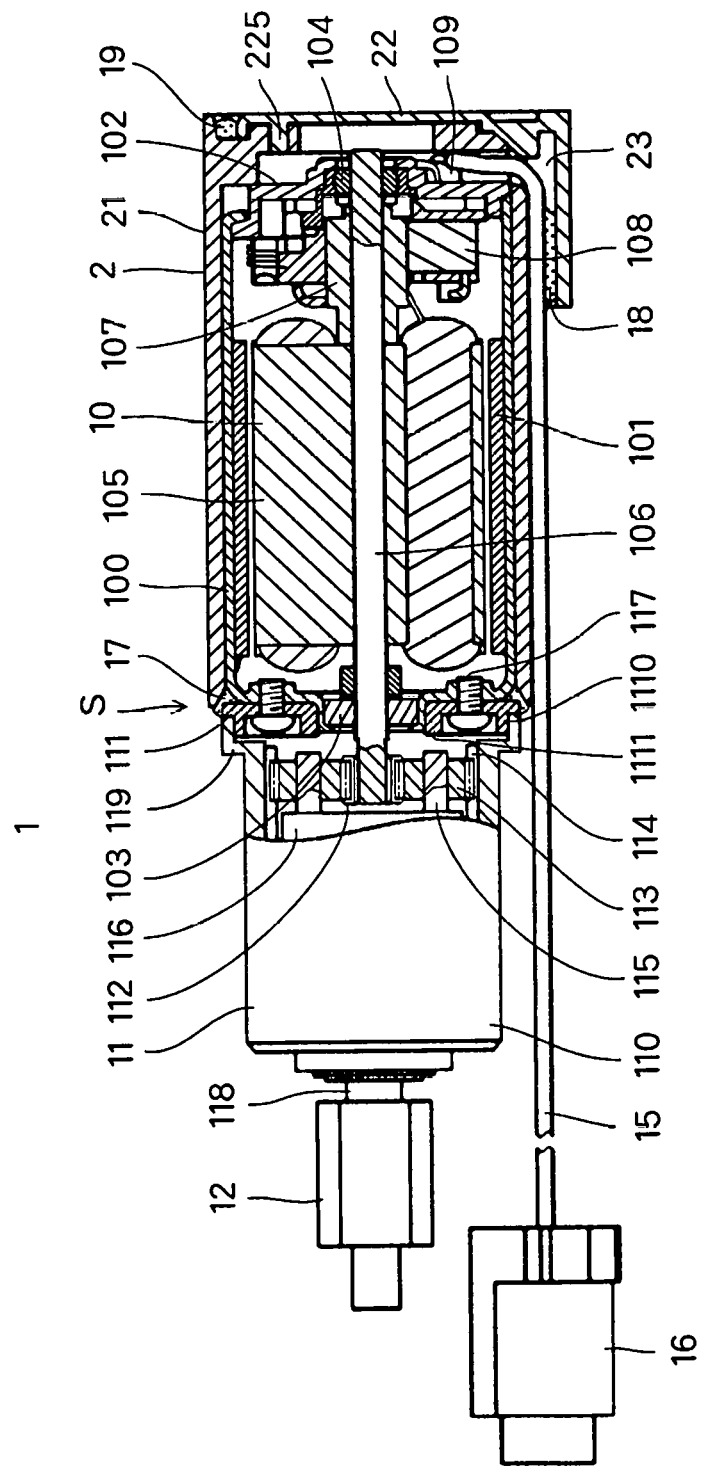
FIG. 13 is an enlarged vertical sectional front view for showing detail of the motor portion with reduction gear structure according to the third embodiment.

That is, as shown in the FIG. 13, the motor apparatus with the waterproof cover for the vehicle 1 according to the third embodiment has a configuration in which, the outer diameter of the motor case 100 of the DC motor 10 is considerably larger than the outer diameter of the reduction gear structure casing 110.

In this embodiment, like the first embodiment, the outer diameter D2 of the end bracket 111 is an intermediate size between the outer diameter D1 of the motor case and the outer diameter D3 of the cylindrical cap, in this embodiment, in order to make the configuration of "D1 is slightly smaller than D2 and D2 is slightly smaller than D3" the outer diameter D2 of the end bracket 111 of the reduction gear structure 11 is set to be larger than the outer diameter of the casing 110 of the reduction gear structure 11.

On the other hand, an enlarged opening portion 119 with a large outer diameter is formed at the opening end of the casing 110 of the reduction gear structure 11, and the outer annular portion 1110 of the outer diameter D2 of the end bracket 111 is pressed into the enlarged opening portion 119. The inner annular portion 1111 of the end bracket 111 is press fitted to the outside of the annular portion (the bearing portion) at the bottom of the motor case 100, in the same manner as in the first embodiment.

According to the third embodiment, at the contact surface S between the motor 10 and the reduction gear structure 11, a gap of a predetermined size enclosed by the bottom surface of the motor case 100, the side surface on the outer side of the end bracket 111 of the reduction gear structure, and the tapered opening portion of the cylindrical cap 21, that is a gap surrounded by mutually mechanically constrained members (a constrained gap) is formed. The other configurations are the same as that of the first embodiment, so that, its explanation is omitted.

According to this embodiment, like the first embodiment, by filling the constrained gap with a photocurable resin adhesive, and irradiating this portion with ultraviolet light or visible light via the cylindrical cap 21, a first seal portion 17 can be formed.

In addition, by making the opening portion of the cylindrical cap to be tapered and setting the outer diameter of the end bracket 111 to be the size between the outer diameter of the motor ease 100 and the outer diameter of the cylindrical cap 2 the photocurable resin adhesive can cover not only the sealed space but also the outer surface of the end bracket 111.

With this configuration, the third embodiment can be obtained the same effects as the first embodiment and the second embodiment. Even when the outer diameter of the casino of the reduction gear structure 11 is different from the outer diameter of the motor, it is possible to combine with the motor of high versatility only by partially changing the shape of the end bracket, and it can be provided an inexpensive motor apparatus with waterproof cover.

Embodiment 4

Next, embodiment 4 is an example in the circumstance where the outer diameter of the DC motor 10 is smaller than the outer diameter of the casing of the reduction gear structure 11.

Figure 14:
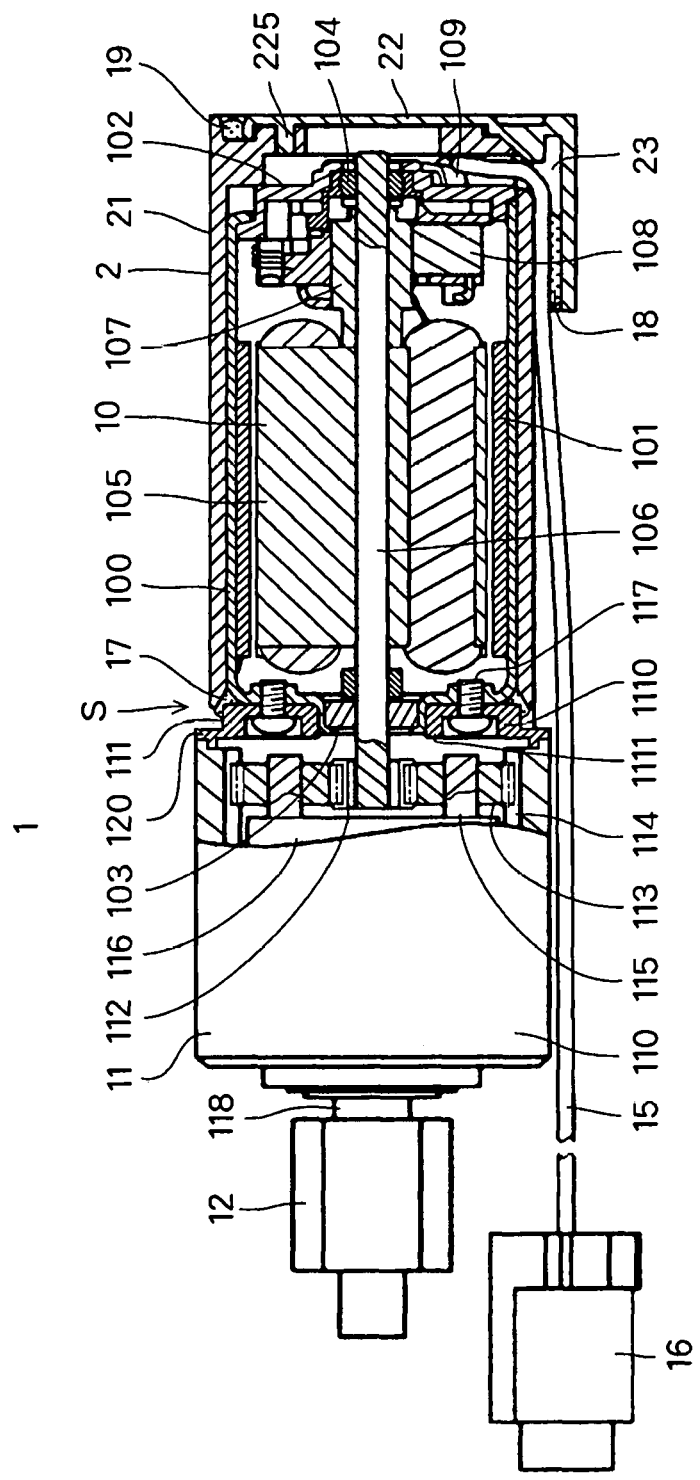
FIG. 14 is an enlarged vertical sectional front view for showing detail of the motor portion with reduction gear structure according to the fourth embodiment.

That is, as shown in FIG. 14, the motor apparatus with a waterproof cover for a vehicle 1 in the fourth embodiment has a configuration in which the outer diameter of the motor case 100 of the DC motor 10 is smaller than the outer diameter of the casing 110 of the reduction gear structure.

Therefore, in the present embodiment, in order to make the outer diameter D2 of the contact surface S of the end bracket 111 of the reduction gear structure 11 is set to the same condition as in the first embodiment, that is the configuration of "D1 is slightly smaller than D2 and D2 is slightly smaller than D3", in the end bracket 111, a stepped structure portion 120 having a small diameter portion and a large diameter portion is formed. The outside diameter of the small diameter portion of the stepped structure portion 120 is denoted by D2. On the other hand, the casing 110 of the reduction gear structure is press-fitted and fixed to the large diameter portion of the stepped structure portion 120. The other configurations are the same as that of the first embodiment, so that, its explanation is omitted.

According to the fourth embodiment, at the contact surface S between the motor 10 and the reduction gear structure 11, a gap of a predetermined size enclosed by the left side surface of the motor case 100, the outer side surface of end bracket 111 of the reduction gear structure, the tapered opening portion 211 of the cylindrical cap 21, that is a gap surrounded by mutually mechanically constrained members (a constrained gap) is formed.

Then, the restrained gap is filled with a photocurable resin adhesive, and irradiating this portion with ultraviolet light or visible light via the cylindrical cap 21, a first seal portion 17 can be formed.

Further, the opening portion of the cylindrical cap is tapered, and the outer diameter D2 of the small diameter portion of the end bracket on the contact surface S is set to a size intermediate between the outer diameter of the motor case and the outer diameter of the cylindrical cap, the photocurable resin adhesive can cover not only the constrained gap but also the outer surface of the end bracket 111.

With this configuration, it can be obtained the same effects as the first embodiment and the second embodiment. Even when the outer diameter of the casing of the reduction gear structure 11 is different from the outer diameter of the motor, it can be combined with the motor of high versatility only by partially changing the shape of the end bracket, and it can be provided an inexpensive motor apparatus with waterproof cover.

Embodiment 5

The motor apparatus with waterproof cover of the present invention is not limited to use for a vehicle. By applying the motor of the present invention to a motor which has a possibility that moisture is present around, used in a closed environment with large temperature difference, and continuous rotation time is short, the same effect as that of each of the above embodiments can be obtained.

The invention claimed is:

1. A motor apparatus with a waterproof cover for a vehicle, comprising:
    a motor having a cup-shaped motor case, an end cover fixed to an opening portion of the cup-shaped motor case, and a rotating shaft held by a bottom portion of the motor case and the end cover;
    a reduction gear structure having a cup-shaped casing, an end bracket fixed to an opening portion of the cup-shaped casing, a reduction gear disposed inside the cup-shaped casing, an input shaft, and an output shaft, wherein the rotating shaft of the motor is the input shaft of the reduction gear structure, and the input shaft is coaxial with the output shaft; and
    a cup-shaped waterproof cover which is made of a transparent resin and is mounted on an outside of the cup-shaped motor case,
    the end bracket of the reduction gear structure is fixed to a bottom portion of the cup-shaped motor case,
    the cup-shaped waterproof cover comprises a cylindrical cap, a disk-shaped cap cover, a cap engagement portion, and a lead wire guide portion,
    the cap engagement portion is provided on one end of the cylindrical cap and on the disk-shaped cap cover, and brings the cylindrical cap and the disk-shaped cap cover into mechanical engagement with each other,
    the lead wire guide portion is formed between one end of the cylindrical cap and the disk-shaped cap cover, on a side opposed to the cap engagement portion across a center point of the disk-shaped cap cover, for inverting and leading out a motor power supply lead wire and a power supply connection connector into a U shape from the motor to an outside of the waterproof cover, and
    the cylindrical cap is loosely fitted to the cup-shaped motor case,
    the motor apparatus further comprising:
    a first seal portion made of a photocurable resin adhesive which is formed in a vicinity of a contact surface of the cup-shaped motor case with the reduction gear structure and fixes the cylindrical cap to the cup-shaped motor case and the end bracket;
    a second seal portion made of a photocurable resin adhesive at the lead wire guide portion for fixing a part of the power supply lead wire to the lead wire guide portion; and
    a third seal portion made of a photocurable resin adhesive, between the periphery of the one end of the cylindrical cap and the disk-shaped cap cover, for fixing the cylindrical cap and the disk-shaped cap cover to each other.

2. The motor apparatus with the waterproof cover for the vehicle according to claim 1, wherein an opening portion of the cylindrical cap in the vicinity of the contact surface is tapered, an outer diameter of the end bracket is an intermediate size between an outer diameter of the cup-shaped motor case and an outer diameter of the cylindrical cap, and the photocurable resin adhesive covers a surface on an outer side of the end bracket in the first seal portion.

3. The motor apparatus with the waterproof cover for the vehicle according to claim 2, wherein the outer diameter of the cup-shaped motor case and an outer diameter of the cup-shaped casing of the reduction gear structure are different, the end bracket has an outer annular portion and an inner annular portion in a radial direction, on an outer periphery of the outer annular portion, the cup-shaped casing of the reduction gear structure is press-fitted, and the annular portion of the bottom portion of the cup-shaped motor case is press-fitted into the inner annular portion.

4. The motor apparatus with the waterproof cover for the vehicle according to claim 2, wherein the cylindrical cap has a disk-like cap main body mounted on an outer periphery of the motor, a lead wire guide part has a pair of guide rails provided on an outer periphery of one end of the disk-like cap main body, and a lead wire guide groove covered with the pair of guide rails, and a length of the lead wire guide portion is 15 cm to 25 cm.

5. The motor apparatus with the waterproof cover for the vehicle according to claim 2, wherein the cylindrical cap comprises:
a disk-shaped cap body mounted on an outer periphery of the motor, openings provided at both ends of the disk-shaped cap body, the lead wire guide portion provided on an outer periphery of one end of the disk-shaped cap body, and a cover fixing portion provided at one end of the disk-shaped cap body, the cover fixing portion has a cover engaging hole, the disk-shaped cap cover has a fixing pin that engages with the cover engaging hole, a cap engaging portion includes a cover engagement hole and the fixing pin, the first seal portion, the second seal portion, and the third seal portion are configured so that a space for confining the motor in the waterproof cover has an adhesive strength capable of maintaining airtightness against a large pressure variation with respect to the atmospheric pressure.

6. The motor apparatus with the waterproof cover for the vehicle according to claim 2, wherein the motor is a DC motor apparatus, a pair of power supply terminals electrically connected to a pair of brushes extend from inside to outside of the end cover, an outer surface of the end cover are bent so as to approach each other, and a feeder lead wire is connected to a tip of the pair of power supply terminals.

7. The motor apparatus with the waterproof cover for the vehicle according to claim 2, wherein the motor is a brushless DC motor driven by an inverter, and a power supply lead wire, connected to each stator coil via the inverter, and a communication cable, connected to an inverter drive control section for controlling the inverter, are inverted into a U shape and lead out from the cup-shaped motor case through the lead wire guide portion to the outside of the waterproof cover.

8. The motor apparatus with the waterproof cover for the vehicle according to claim 2, wherein the motor, to which the reduction gear structure is fixed, is a motor for driving a pop-up mechanism of a door handle of the vehicle, and the motor, to which the reduction gear structure is fixed, is installed in a door casing inside the door handle of the vehicle.

* * * * *